March 27, 1962  M. K. APPIUS  3,026,768
READING DEVICE ON A BALANCE
Filed Sept. 17, 1959  2 Sheets-Sheet 1

3,026,768
READING DEVICE ON A BALANCE
Max Karl Appius, Rapperswil, Switzerland, assignor to
Erhard Mettler, Zurich, Switzerland
Filed Sept. 17, 1959, Ser. No. 840,669
Claims priority, application Switzerland Apr. 2, 1959
4 Claims. (Cl. 88—24)

This invention relates to a reading device on a balance and more particularly to a reading device in which the movable measuring member of the balance has attached to it a calibrated plate with a fine scale. By means of a projection apparatus the particular section of the fine scale which is present in the projection field is thrown optically enlarged onto a screen, in order to read off the last decimals of weight of the article to be weighed. In an inclination balance the graduated plate is generally secured to the balance beam. In a spring balance without any actual beam, the calibrated plate is attached to the pan carrier.

Objects of the invention are to provide a reading device of the type stated in which the graduated plate attached to the movable measuring member of the balance has a guide line extending obliquely with respect to the direction of movement of said plate. This guide line is thrown optically enlarged onto the screen of a projection apparatus and a rough scale is arranged at said screen which extends perpendicularly to the apparent direction of movement of the optically enlarged section of the calibrated plate visible on said screen. The visible section of said guide line then intersects that part of the rough scale which corresponds to the rough weight of the article to be weighed.

Figure 1:
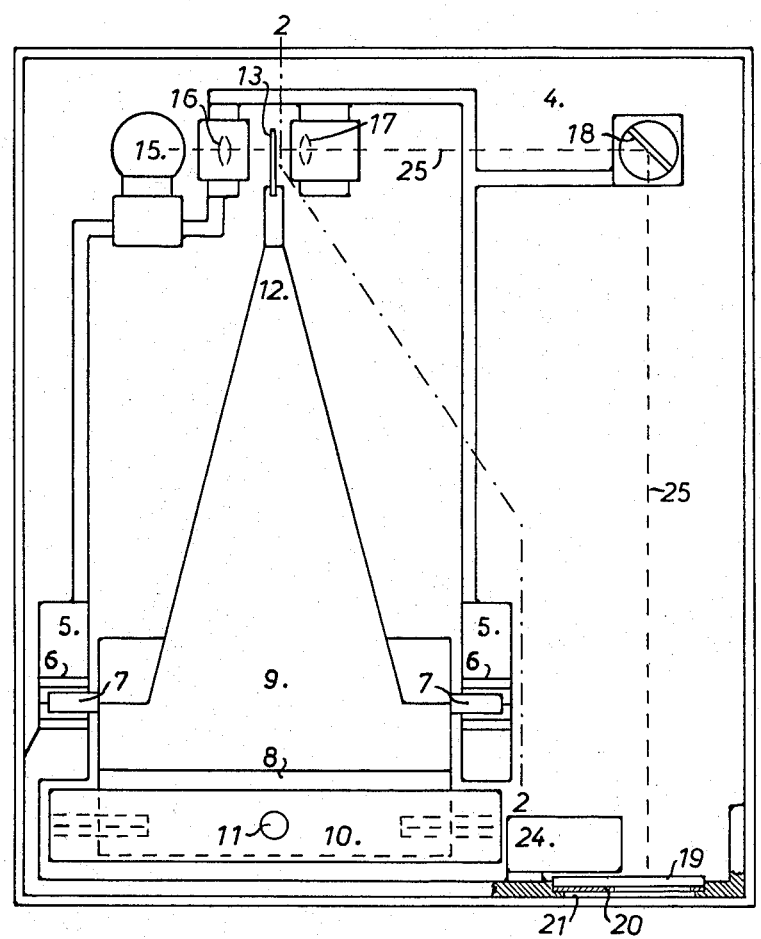
Figure 2:
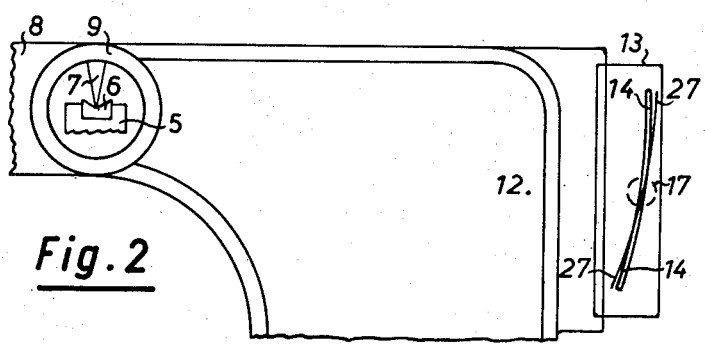
Figure 3:
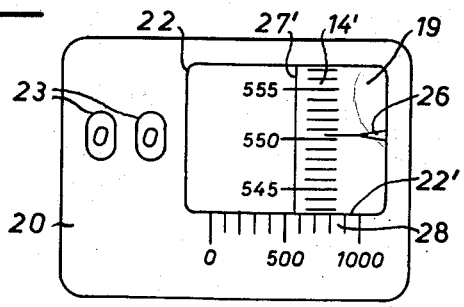

These and other objects and the advantages of the invention will be be understood from the following description of specific embodiments when read in connection with the accompanying drawings in which:

FIG. 1 shows a simplified plan of a balance with a projection apparatus for the optical enlargement of the graduated and numbered plate provided with a fine scale, FIG. 2 shows a side view of the balance beam provided with the graduated plate in vertical section along the line 2—2 in FIG. 1, and FIG. 3 shows a front view of the cover plate and the part of the projection screen exposed thereby, on an enlarged scale in comparison with FIGS. 1 and 2.

The rack of the balance comprises a base 4 and bearing brackets 5 to which are secured the bearings 6 for supporting the balance-beam knife edges 7. The pan carrier 10 is pivotally supported on the shorter arm 8 of the balance beam 9 by means of an end knife-edge, not shown in detail, and channel-shaped bearings. The balance pan is placed on a pin 11 present on the pan carrier 10. In the plan view of FIG. 1, the balance housing which normally rests on the rack of the balance is assumed to have been removed. The longer arm 12 of the balance beam 9 serves as a measuring member and is provided with a counterweight which is not shown in detail. Finally, control weights, adapted for placing on the balance beam 9 or on the pan carrier 10, may be provided together with means for mechanically placing them in position and removing them; for reasons of clarity, however, these are not illustrated. Secured externally to the longer arm 12 of the balance beam is a graduated or numbered plate 13 of glass which comprises a fine scale in the circular sector field 14 (FIG. 2). The projection apparatus for the optically enlarged observation of the fine scale contains a low-voltage illuminating lamp 15 with a condensing optical system 16, an enlarging optical system 17 with a reversing mirror 18 and a glass plate 19 which serves as a screen and which is observed with rear projection. The screen 19, together with a front cover plate 20 is secured in a window 21 in the rack of the balance (FIG. 1). The cover plate 20, which consists of thin sheet metal has a substantially rectangular opening 22 through which the uncovered portion of the glass-screen 19 is visible. In addition, the cover plate 20 may have further apertures 23 behind which are visible the figures of a counter 24 which indicate the first decimals of the weight of the article to be weighed according to the control weights placed on or removed from the balance. In FIG. 1, the optical axis of the projection device 15 to 19 is shown in broken lines and indicated at 25; the linear enlargement should preferably amount to about 50 to 100. The section of the fine scale 14 which lies within the range of the lens 17 (FIG. 2) appears greatly enlarged on the glass screen 19 at 14', as shown in FIG. 3. It is assumed that the fine scale 14 comprises 1000 graduations of which every fifth is numbered. On deflection of the balance beam 9 about its centre knife edge 7, the visible section 14' on the screen 19 travels in the vertical direction past the pointer 26 provided on the screen 19. In addition to the fine scale 14 on the plate 13, there is provided a guide line 27 which runs at an angle thereto and which is always optically enlarged together with the fine scale 14 and appears, in the case illustrated, at 27' on the screen 19 (FIG. 3). Whereas the fine scale 14 (FIG. 2) is bounded substantially by arcs which lie close together and the common centre of which is at the knife edge 7, the guide line 27 is a section of a spiral which runs obliquely over the fine scale 14. Looking at the screen 19, therefore, the visible part 27' of the guide line 27 will travel slowly in the horizontal direction over the visible part 14' of the fine scale 14 if the balance beam 9 is pivoted about its centre knife edge 7; at the same time, the fine scale 14 travels quickly over the screen in the vertical direction.

Finally, a rough scale 28, by means of which the particular position of the visible part 27' of the guide line 27 can be read off, is provided at the lower edge 22' (FIG. 3) of the opening 22 in the cover plate 20 and hence adjacent the lower edge of the visible part of the screen 19. The rough scale 28 has the same beginning and end digits as the fine scale 14, but its graduation is coarser by two powers of ten so that successive graduation marks indicate hundred steps in the fine scale 14. Apart from this, the rough scale 28 is so dimensioned and arranged thaat the position of the visible part 27' of the guide line 27 always indicate the rough weight of the article to be weighed, the exact weight of which is read off at the pointer 26 by means of the visible section 14' of the fine scale. According to FIG. 3, the pointer is indicating a weight of 550.4; accordingly, the visible part 27' of the guide line is running past about 550 on the rough scale 28.

The reading device described permits a very simple and rapid measuring out of goods of a powdered or liquid nature. The latter are generally poured into a container standing on the balance pan, by means of a pouring device. As a result of the steady increase in the weight, the fine scale 14 travels so quickly down the screen 19 that the individual figures can no longer be distinguished. Nevertheless, the point at which the guiding line 27' meets the rough scale 28 travels slowly from the digit 0 towards the right so that the increase in the weight of the goods being poured can be followed continuously. As soon as the visible part 27' of the guide line 27 indicates a rough weight on the rough scale 28 which is only a little below the precise desired value, the measuring or pouring device is restricted to such an extent that the travel of the visible portion 14' of the fine scale can be followed. When the fine scale read off at the pointer 26 indicates the desired weight, the pouring device is stopped.

The guide line 27 (FIG. 2) may be a thin line, as indicated, which, like the fine scale 14, appears in black on a light background or light on the dark background of the screen 19. The guide line 27 may, however, also appear as the boundary line between two different-coloured or differently bright wedge-shaped areas which are provided on the plate 13. Finally, it would be possible to allow the guide line 27 to run obliquely over only one side or the other of the fine scale 14. With the same transverse dimensions of the screen 19 however, the rough scale 28 would then have to be compressed and displaced to the corresponding side of the visible portion 14' of the fine scale. If the rough scale 28 comprises only a few graduation marks, it is generally sufficient to inscribe only the zero mark with the digit 0 and to dispense with other numerical data. Apart from this, it is necessary to add to the weight values indicated by the rough scale 28 or the fine scale at the pointer 26, those which result from the actuation of any control weights and which appear as the first decimals of the weight in the excisions 23. These and similar modifications must be understood as being within the scope of the invention as set forth in the following claims.

I claim:

1. In combination with a balance having stationary and movable elements, a scale reading device comprising a calibrated plate connected to said balance movable element for movement in a given direction relative to the stationary element of said balance, a fine scale and a guide line on said calibrated plate, said fine scale extending in the direction of movement of said calibrated plate and said guide line extending obliquely relative to the direction of movement of said calibrated plate, a screen and a pointer connected to the stationary element of said balance for reading off the last decimals of weight of the article to be weighed by said balance, projection means for optically enlarging a section of said calibrated plate and for projecting the same onto said screen, and a stationary rough scale arranged at said screen and extending perpendicularly to the apparent direction of movement of the optically enlarged section of said calibrated plate visible on said screen to cause the visible section of said guide line to intersect that part of the rough scale which corresponds to the weight value next preceding the last weight decimals of the article to be weighed.

2. The invention as recited in claim 1, wherein said guide line is drawn obliquely over said fine scale.

3. The invention as recited in claim 1, wherein the calibration of said rough scale is coarser by several powers of ten than the calibration of said fine scale.

4. The invention as recited in claim 1, wherein said rough scale is provided at the edge of said screen.

References Cited in the file of this patent

UNITED STATES PATENTS

| | | |
|---|---|---|
| 2,071,416 | Marshall | Feb. 23, 1937 |
| 2,343,621 | Williams | Mar. 7, 1944 |

FOREIGN PATENTS

| | | |
|---|---|---|
| 149,126 | Switzerland | Aug. 31, 1931 |
| 1,044,423 | Germany | Nov. 20, 1958 |
| 1,046,894 | Germany | Dec. 18, 1958 |